(12) United States Patent
Matthews et al.

(10) Patent No.: US 8,880,871 B2
(45) Date of Patent: Nov. 4, 2014

(54) HASH TABLE ORGANIZATION

(71) Applicant: Broadcom Corporation, Irvine, CA (US)

(72) Inventors: Brad Matthews, San Jose, CA (US); Bruce Kwan, Sunnyvale, CA (US); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/628,123

(22) Filed: Sep. 27, 2012

(65) Prior Publication Data

US 2013/0173908 A1 Jul. 4, 2013

Related U.S. Application Data

(60) Provisional application No. 61/582,523, filed on Jan. 3, 2012.

(51) Int. Cl.
*H04L 29/06* (2006.01)
(52) U.S. Cl.
USPC .......................................... 713/153; 380/278

(58) Field of Classification Search
CPC .................... G06F 17/30949; H04L 45/7453; H04L 2209/56; H04L 2209/603; H04L 2209/805; G11B 20/00086; G11B 20/00123; G11B 20/0021; G11B 20/00384; G11B 20/00405; G11B 20/00876
See application file for complete search history.

(56) References Cited

U.S. PATENT DOCUMENTS

| | | | | |
|---|---|---|---|---|
| 4,922,417 | A * | 5/1990 | Churm et al. | 1/1 |
| 5,390,359 | A * | 2/1995 | Damerau | 1/1 |
| 7,325,002 | B2 * | 1/2008 | Zuk | 1/1 |
| 7,664,927 | B2 * | 2/2010 | Erlingsson et al. | 711/216 |
| 2004/0260927 | A1 * | 12/2004 | Grobman | 713/172 |
| 2008/0229056 | A1 * | 9/2008 | Agarwal et al. | 711/216 |
| 2011/0202744 | A1 * | 8/2011 | Kulkarni et al. | 711/216 |

* cited by examiner

*Primary Examiner* — Farid Homayounmehr
*Assistant Examiner* — Maung Lwin
(74) *Attorney, Agent, or Firm* — Oblon, Spivak, McClelland, Maier & Neustadt, L.L.P.

(57) ABSTRACT

Disclosed are various embodiments for improving hash table utilization. A key corresponding to a data item to be inserted into a hash table can be transformed to improve the entropy of the key space and the resultant hash codes that can generated. Transformation data can be inserted into the key in various ways, which can result in a greater degree of variance in the resultant hash code calculated based upon the transformed key.

18 Claims, 5 Drawing Sheets

204/302

HASH TABLE ORGANIZATION

CROSS-REFERENCE TO RELATED APPLICATIONS

This application claims priority to U.S. Provisional Application No. 61/582,523, filed Jan. 3, 2012, which is incorporated herein by reference in its entirety.

BACKGROUND

In networked environments that include network switches and potentially other devices and systems that analyze network traffic, hash tables can be employed as data structures to facilitate analysis, filtering, routing or other operations. For example, information extracted from a packet received by a network switch can be stored in a hash table and later referred to if subsequent packets having similar and/or identical properties are received in the future.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Embodiments of the present disclosure relate to systems and method for improving hash table utilization in various environments. In one embodiment, systems and methods according to the disclosure can be employed in a network switch or similar systems that store data regarding data packets based upon a hash code that is generated from a key based on a subset of packet fields from the data packets. Embodiments of the present disclosure can also be employed in any environment in which a hash table is used as a data structure to store and/or retrieve data. Accordingly, while discussion of the embodiments herein may be in the context of a network switch, it should be appreciated that the systems and methods of hash table organization and optimization can be applied in other contexts as well.

Figure 1:
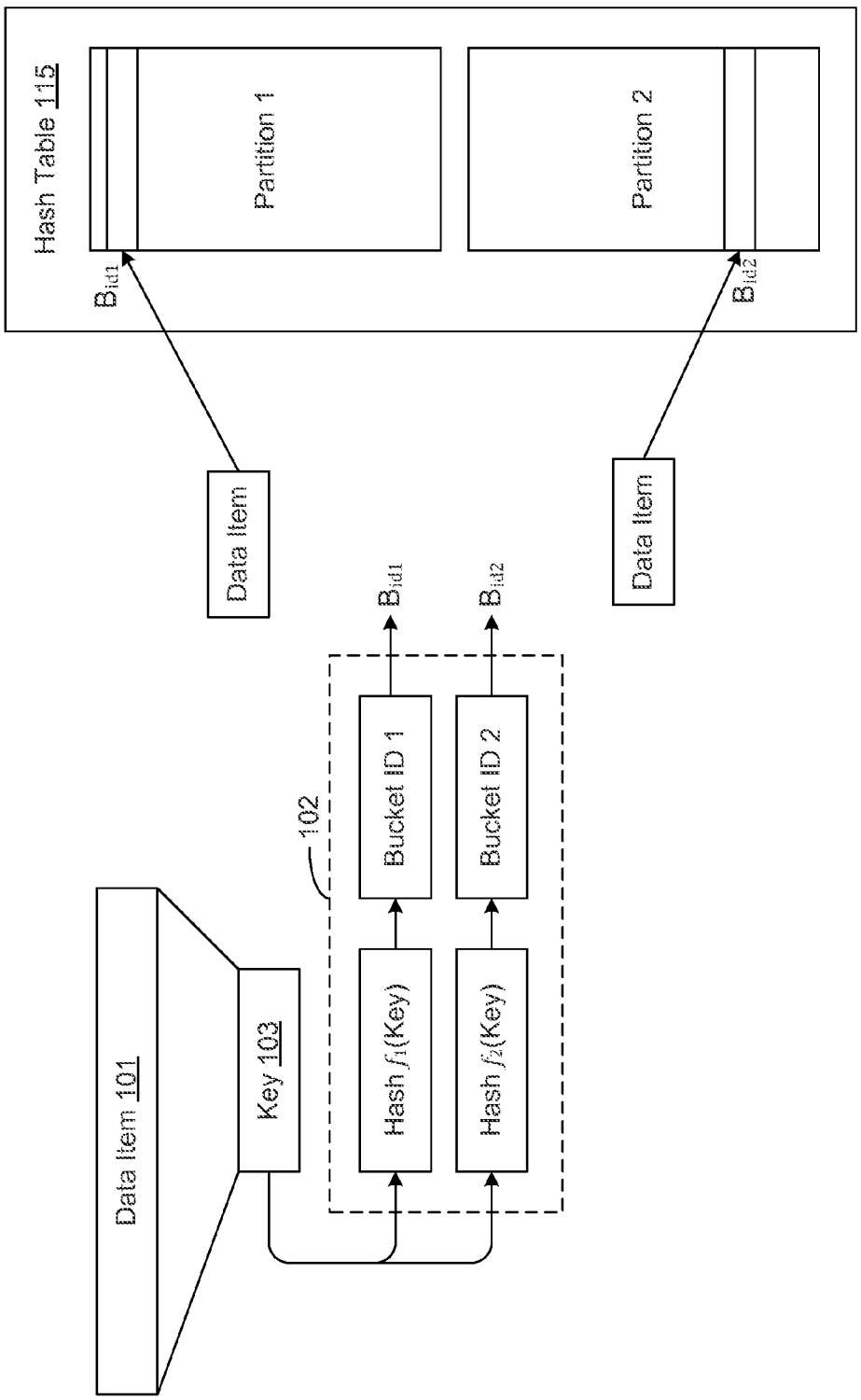
FIG. 1 is a drawing of a methodology of storing data items in a hash table.

With reference to FIG. 1, shown is an example of a methodology in which a data item 101, such as a packet and/or data associated with a packet that is received in a network switch, can be stored in a hash table 115 having one or more partitions. In the example shown in FIG. 1 and that is continued in FIGS. 2-3, the data item 101 can represent a network packet having various fields that may be of interest to a user and/or administrator associated with a network switch in which embodiments of the disclosure can be implemented. For example, a network switch may be configured to facilitate operation of a virtual local area network (VLAN). Accordingly, a network switch so configured may cache and/or store information about various members of the VLAN that can be extracted from a packet received in the network switch in a hash table that is accessible to the switch.

For example, a network switch may be configured store data about a packet in a hash table based upon a VLAN identifier (VID) that can be extracted from the packet. In this example, the key associated with the data can be the VID, and the value can be at least a subset of the packet fields associated with the packet. In this sense, it should be appreciated by a person of ordinary skill in the art that a key associated with a hash table entry can comprise some subset of a data item and the value stored in the hash table 115 can comprise at least a subset of the data item, and in many cases, a larger subset of the data item. For example, in a network switch or other networking applications, a hash table can be used to efficiently implement tables that can be used for forwarding functionality. In this example, incoming packets have packet fields that can be used to build a key. A hash function can then be executed on the key to facilitate identification of a location in the table where the corresponding data (e.g., forwarding information) associated with the key can be stored in the hash table.

Returning to the example of FIG. 1, shown is a data item 101 that can represent a network packet, a subset of network packet fields, or any data that is desired to be stored in the hash table 115. The depicted example of a hash table 115 illustrates one having two partitions in which the data item can be stored. It should be appreciated that the hash table 115 can include one or more partitions. The data item 101 can be stored in a location in one or both partitions that can be identified with a bucket identifier. In many implementations of a hash table, the bucket identifier can represent an array and/or linked list that allows for the storage of multiple data items potentially along with an associated key and/or hash code, as it should be appreciated that differing data items 101 may resolve to the same bucket identifier by a hash function employed to calculate a bucket identifier.

Therefore, in order to store the data item 101 in the depicted hash table 115, a key 103 can be generated that is based at least upon the data item 101 by a hashing block 102. In other words, the key 103 can represent some subset of the data from the data item 101. Accordingly, a hash function $f_1$ and $f_2$ can be executed on the key 103 to yield a first hash code and a second hash code. The hash functions can be chosen to yield a first hash code and second hash code that each correspond to a location in each of the two partitions of the hash table 115 at which the data item 101 can be stored. In the example shown in FIG. 1, a bucket identifier corresponding to a location in each partition can be generated based at least in part upon each of the hash codes resulting from execution of the hash functions. Accordingly, some or all of the data item 101 can be stored in each of the partitions of the hash table 115 in a location corresponding to each of the bucket identifiers.

A key 103 corresponding to a data item 101 to be stored in the hash table is, in many cases, larger than the total number of available entries in the partitions of the hash table 115. Consequently, an insertion into a hash table can be rejected due to collisions. That is to say that in some cases, the number of bucket identifiers that can be generated from all of the possible key 103 values can sometimes be greater than the number of partitions in the hash table 115. In some cases, differing data items 101 may result in the same or similar keys 103, which can likewise result in the same corresponding bucket identifier being generated that correspond to the data items 101.

One relevant measure that is related to these issues is the first miss utilization (FMU), which corresponds to the percentage of the available hash table space that can be utilized before observing a "miss" or collision in the hash table. Factors that can lead to poor FMU are hash functions that are unable to address the wide range of the hash table entries. For example, cyclic redundancy check (CRC) is a commonly implemented hash function. However, it is known that CRC variants (e.g., CRC-32) may, in some cases, not perform well in some systems in terms of distributing keys across all hash table entries when the keys 103 corresponding to the data items 101 possess low entropy (e.g., few bits changing from one key 103 and/or data item 101 to the next, low hamming distance between keys, etc.).

Figure 2:
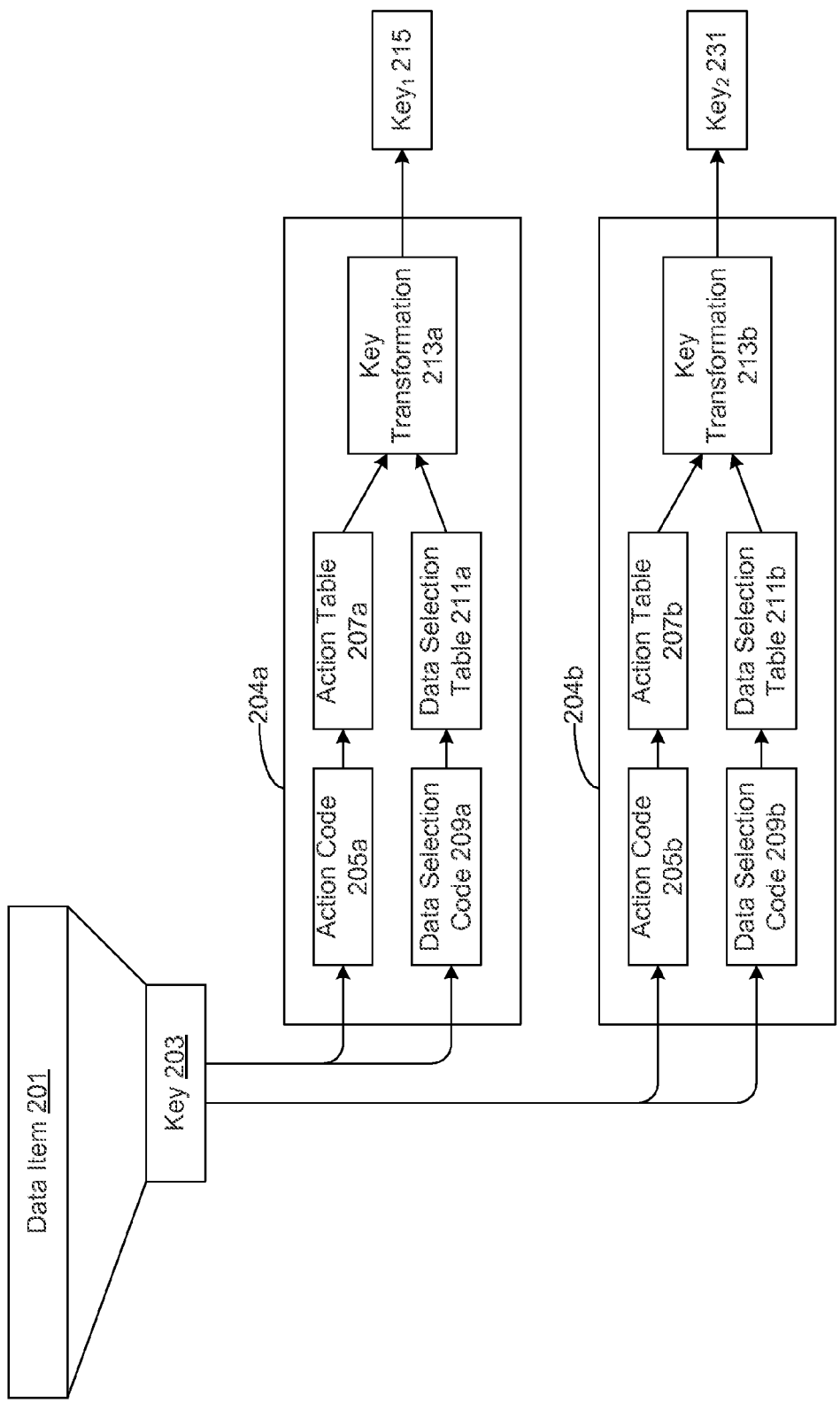
FIG. 2 is a drawing of a methodology for transforming keys associated with data items in a key transformation block according to an embodiment of the disclosure.
Figure 3:
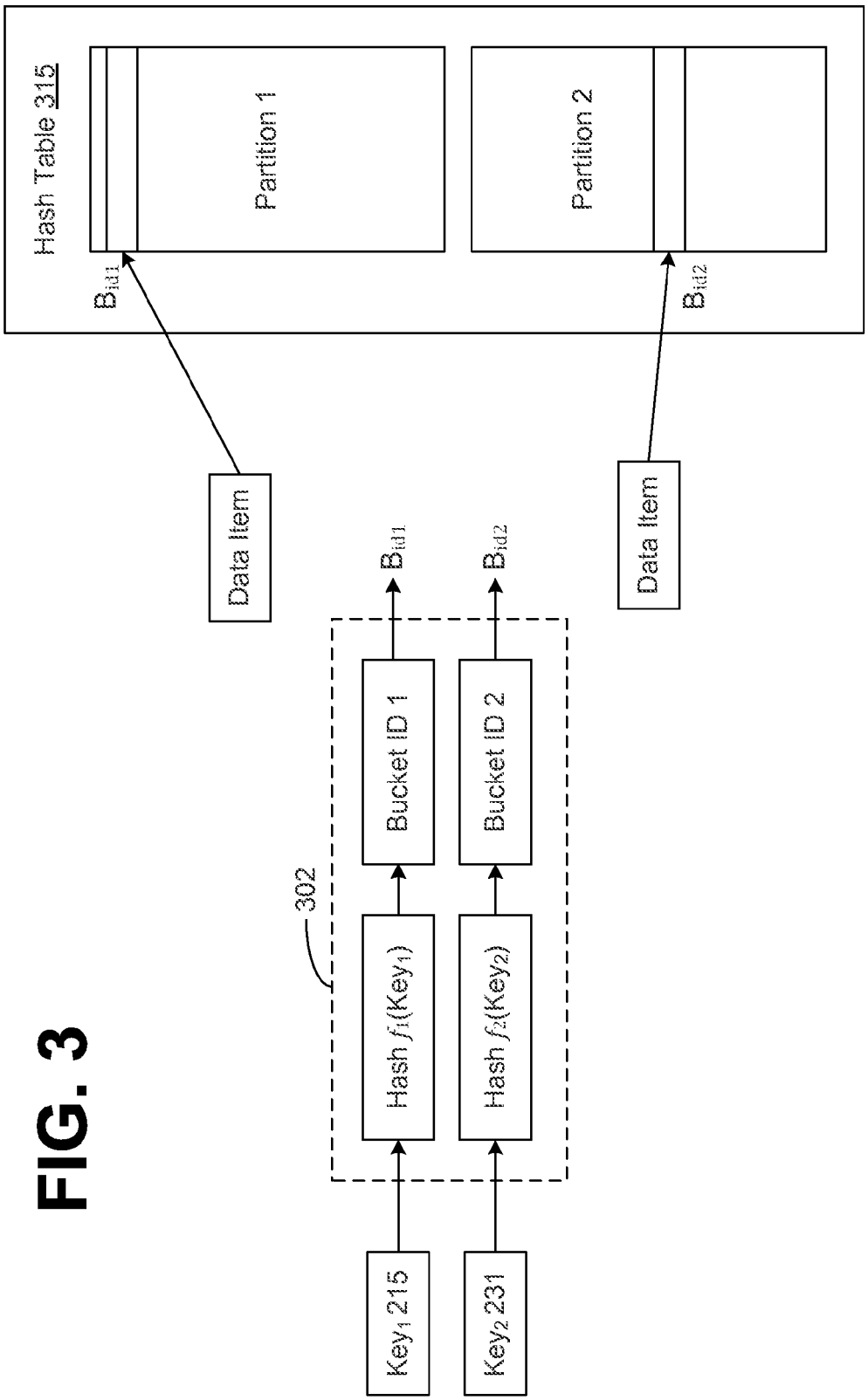
FIG. 3 is a drawing of a methodology of storing data items in a hash table using transformed keys generated as shown in FIG. 2 in a hashing block according to an embodiment of the disclosure.

Accordingly, as shown in the methodology illustrated in FIGS. 2-3, embodiments of the disclosure can map keys with potentially low entropy (e.g., low hamming distance between keys) to a key space with a greater degree of entropy (e.g., a higher hamming distance between keys) relative to the methodology illustrated in FIG. 1. Therefore, reference is now made to FIG. 2, which illustrates an example of a methodology employed to improve utilization of a hash table according to various embodiments of the disclosure.

FIG. 2 illustrates an example of how a key 203 corresponding to a data item 201 can be transformed to effectively increase the entropy of keys corresponding to various data items relative to an embodiment employing the methodology illustrated in FIG. 1 by increasing the information content in a controlled manner. Accordingly, a data item 201 can be received and a key 203 generated or extracted that is based at least in part upon the data item 201.

The key 203 can be passed to a key transformation block 204a that can transform the key 203 into a transformed key 215 that possesses higher entropy relative to an embodiment of FIG. 1. An action code 205a can be generated by the key transformation block 204a that corresponds to the key 203, which can in turn be used to a select a transformation action from an action table 207a. The action code 205a can be generated by employing a hash function or any other function that can be used to generate a code corresponding to the key 203, such as an exclusive or (XOR), a folded XOR, or any other hash function. As an alternative example, the action code 205a can be generated by extracting a byte from the key 203, which can represent an integer that in turn represents a row in the action table 207a. In other words, any function or operation can be chosen such that an action code 205a corresponds to an entry in the action table 207a. The action table 207a can correspond to a table or other data structure that comprises entries corresponding to transformation actions that can be executed on the key 203 to produce a transformed key 215. For example, the action table 207a can include entries corresponding to data transformation actions such as, but not limited to, a prepend, an append, and/or any data interleaving process by which data can be inserted into the key 203. The action table 207a can also include entries corresponding to any mathematical and/or string operations that can transform a key 203.

The key transformation block 204a can also generate a data selection code 209a that can in turn be used to select transformation data from the data selection table 211a. The transformation data chosen from the data selection table 211a can then be inserted into the key 203 according to the operation that corresponds to the action code 205a. The data selection code 209a can be chosen by employing the methodology described above with reference to the action code 205a.

In some embodiments, the key transformation block 204a can be configured with differing hash functions or other types of operations to generate the action code 205a and the data selection code 209a. As one example, the operations chosen to generate the action code 205a and the data selection code 209a can be orthogonal (or as orthogonal as possible) relative to one another. The orthogonality of the operations with which the key transformation block 204a is configured to generate an action code 205a and data selection code 209a can improve the entropy of keys 203. In other words, the orthogonality can reduce the chance that differing keys 203 transformed by the key transformation block 204 results in the same transformed key.

As noted above, the data selection table 211a includes transformation data with which the key transformation block 204a can transform a key 203 to produce a transformed key 215. In one embodiment, the data selection table 211a can comprise a table or other data structure that is sized equivalent to the number of possible data selection codes 209a that can be generated and include a data entry that corresponds to each possible data selection code 209a. For example, the data selection table 211a can comprise a 256-entry data structure that includes 256 data entries when an operation chosen to generate a data selection code 209a results in 256 possible data selection codes 209a. The data entries in the data selection table 211a can include random or pseudo-random data. In another embodiment, the data selection table 211a can be modified and/or tuned by a user to improve hash table utilization if a random set of data or any other data set in the data selection table 211a results in less than desirable utilization.

Accordingly, key transformation block 204a can execute a key transformation 213a and transforms the key 203 by applying the selected transformation action and transformation data corresponding to the key 203. As a result, a transformed key 215 can be generated.

FIG. 2 illustrates an example of a system that can support a two partition hash table. Therefore, a second key transformation block 204b can be employed to generate a second transformed key 231. Accordingly, the key 203 can be employed by the key transformation block 204b to select an additional action code 205b and data selection code 209b, which in turn can be used to select another transformation action from a second action table 207b as well as additional transformation data from the data selection table 211b, respectively. A key transformation 213b process can be executed to generate the second transformed key 231. In order to effectively increase entropy of the key space, the operation used to generate the second action code 205b as well as the second data selection code 209b can differ from those chosen in the first key transformation block 204. Additionally, the action table 207b and/or data selection table 211b can likewise vary from the first key transformation block 204a to further this aim. Accordingly, as a result, a first transformed key 215 and a second transformed key 231 can be generated with higher entropy relative to an embodiment employing the methodology of FIG. 1

It should be appreciated that while an example of generating two keys corresponding to a two partition hash table 115 is illustrated in FIG. 2, embodiments of the disclosure can support a hash table of any number of partitions. For example, a single partition hash table can be used in an embodiment. In such a scenario, only a single key transformation block would be required. In another embodiment, three or more partitions can be used with a corresponding increase in the number of key transformation blocks. Other variations and permutations should be appreciated by a person of ordinary skill in the art.

Continuing the example of FIG. 2, reference is now made to FIG. 3, which illustrates an example of how bucket identifiers or a location in each of the hash table 315 partitions corresponding to the transformed keys 215, 231 can be generated by a hashing block 302. In the depicted example, bucket identifiers can be generated according to a methodology that varies from the one illustrated in FIG. 1. In this example, the transformed keys 215, 231 can be used as inputs from which the hash functions f1 and f2 can determine a hash code on which a location in the one or more hash table partitions that the data item 201 can be stored. The bucket identifiers generated from the transformed keys 215, 231 can vary to a greater degree relative to the methodology shown in FIG. 1.

Each of the hash functions can be chosen such that they are as orthogonal as possible relative to one another. The hash functions can comprise any known or custom hash functions that can generate a hash code from an inputted key as should be appreciated by a person of ordinary skill in the art. For example, the hash functions can comprise CRC variants, a Fowler-Noll-Vo, Bob Jenkins variants, Versatile Hash, and other functions as can be appreciated.

Figure 4:
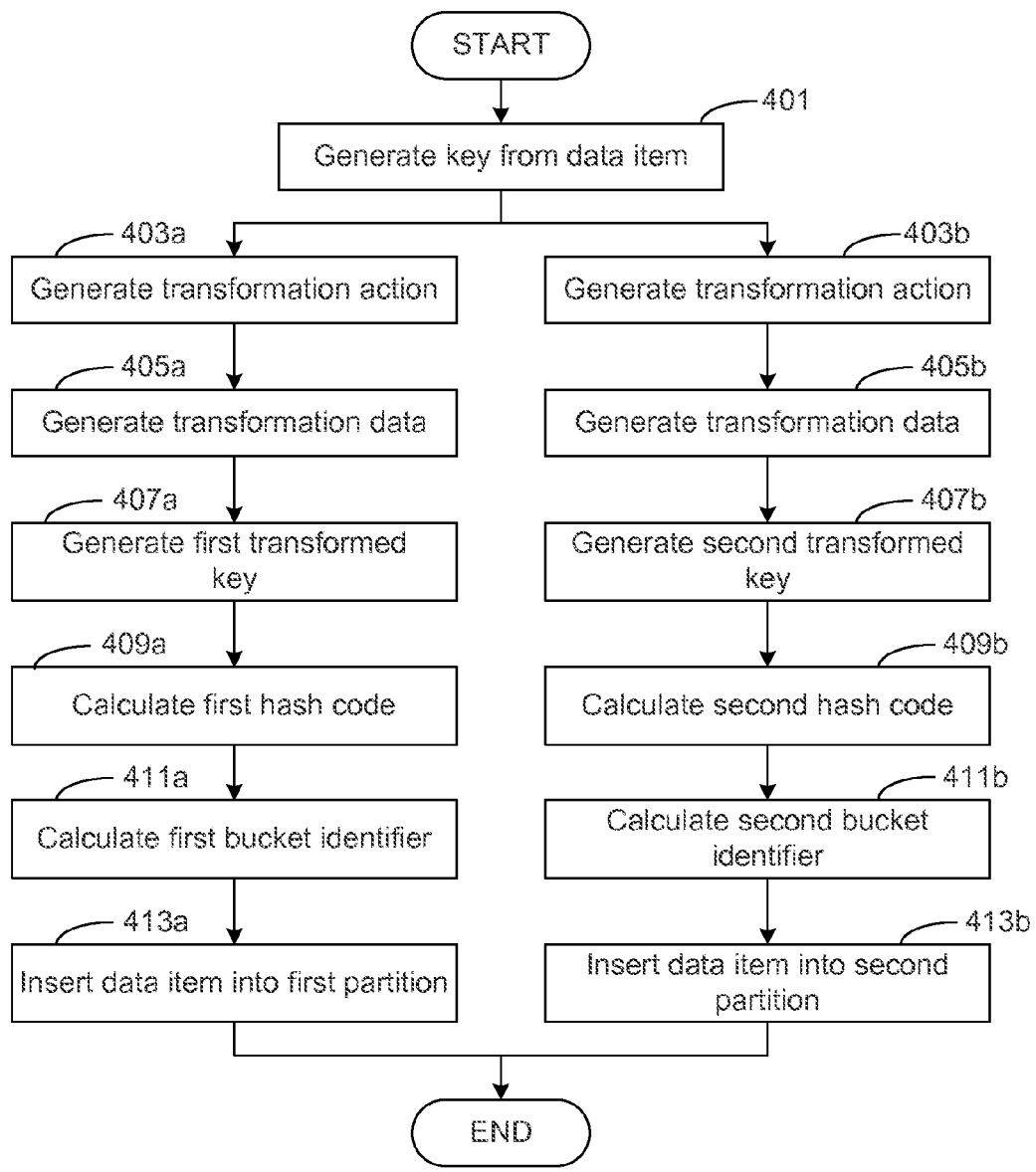
FIG. 4 is a flowchart illustrating one example of a hashing block and key transformation block according to an embodiment of the disclosure.

Referring next to FIG. 4, shown is a flowchart that provides one example of the operation of a portion of a key transformation block 204 and hashing block 302 according to various embodiments. It is understood that the flowchart of FIG. 4 provides merely an example of the many different types of functional arrangements that may be employed to implement the operation of the portion of the hashing block 302 and/or key transformation block 204 as described herein. As an alternative, the flowchart of FIG. 4 may be viewed as depicting an example of steps of a method implemented in a computing device, network switch, or any other system employing a hash table.

To begin, in box 401, a key can be extracted and/or generated from a data item desired to be stored in a hash table. In the example illustrated in FIGS. 2-3 and continued in FIG. 4, an example of a process associated with two partition hash table. Accordingly, transformation of the key as well as generating of hash codes and locations in the hash table partitions in which the data item is to be stored can be executed in parallel fashion. Accordingly, the key generated in box 401 can be processed in the depicted parallel paths. In box 403a, 403b, the key transformation block 204 can generate a transformation action. As described above, the transformation action can be derived from a transformation action code based at least upon the key. In box 405a, 405b, the key transformation block 204 can generate transformed data that can be combined with the key according to the transformation action selected in box 403a, 403b. In box 407a, the key transformation block 204 can generate a resultant transformed key.

In box 409a, 409b, the hashing block 302 can calculate a hash code corresponding to each of the transformed keys generated in box 407a, 407b. As noted above, these hash functions can be selected such that they are substantially orthogonal relative to one another. In box 411a, 411b, a bucket identifier or location in a hash table partition that corresponds to the calculated hash codes can be generated. Finally, in box 413a, 413b, the data item can be inserted into its respective partition.

Figure 5:
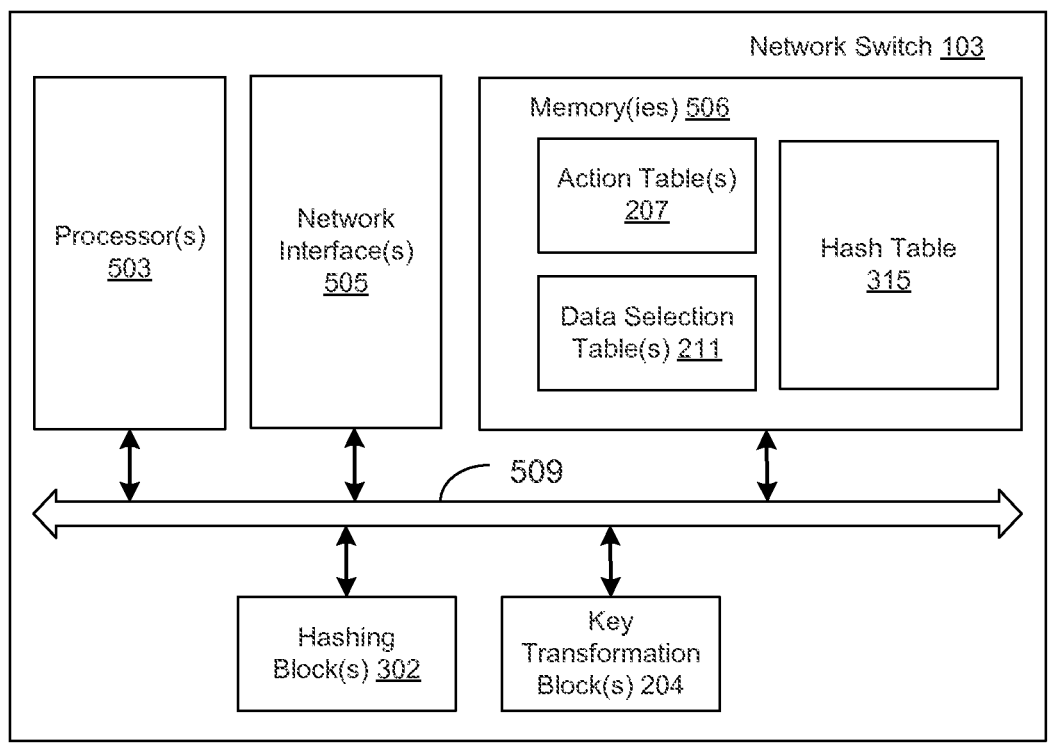
FIG. 5 is an example of a network switch in which the hashing block and key transformation block can be implemented according to an embodiment of the disclosure.

With reference to FIG. 5, shown is a schematic block diagram of the network switch 501 according to an embodiment of the present disclosure. The network switch 501 represents an example of one system in which an embodiment of the disclosure can be implemented. It should be appreciated that embodiments of the disclosure can be implemented in various types of systems or any device, such as a general purpose computing device, in which a hash table can be employed. The depicted network switch 501 includes at least one processor circuit, for example, having a processor 503, network interface(s) 505 and a memory 506, both of which are coupled to a local interface 509. The network interface 505 can comprise, for example, one or more interconnection to a physical network and/or wireless network. The local interface 509 may comprise, for example, a data bus with an accompanying address/control bus or other bus structure as can be appreciated.

Stored in the memory 506 are both data and components that can be retrieved and/or executed by the processor 503. In particular, stored in the memory 506 and executable by the processor 503 are the action table 207, data selection table 211 as well as potentially a hash table 315. In addition, an operating system may be stored in the memory 506 and executable by the processor 503. It is understood that there may be other applications that are stored in the memory 506 and are executable by the processor 503 as can be appreciated.

In the depicted embodiment, the hashing block 302 and key transformation block 204 are implemented as hardware components or processors that are coupled to the local interface 509. In some embodiments, the hashing block 302 and/or key transformation block 204 can be implemented along with the other functionality associated with the network switch 103 in a custom logic board. In yet other embodiments, the hashing block and/or key transformation block 204 can be implemented as software executable by a general purpose processor. Other variations should be appreciated by a person of ordinary skill in the art.

In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, flash memory, solid-state drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 4 shows the functionality and operation of an implementation of portions of the hashing block 302 and/or key transformation block 204. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, can be embodied in any non-transitory computer-readable medium for use by or in connection with an instruction execution system such as, for example, a processor 503. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described the invention, at least the following is claimed:

1. A non-transitory computer-readable medium storing a program that, when executed by a computing device, causes the computing device to:
    receive a data item via a network;
    generate a key based on a subset of data from the received data item;
    calculate a first transformation action code, the first transformation action code corresponding to a first transformation action in which a first transformation data is inserted into the key to form a first transformed key;
    calculate a second transformation action code, the second transformation action code corresponding to a second transformation action in which a second transformation data is inserted into the key to form a second transformed key;
    generate the first transformed key according to the first transformation action code by inserting the first transformation data into the key;
    generate the second transformed key according to the second transformation action code by inserting the second transformation data into the key;
    calculate a first hash code based on the first transformed key with a first hash function;
    calculate a second hash code based on the second transformed key with a second hash function that is orthogonal to the first hash function;
    insert the data item in a first partition of a hash table in a first location corresponding to the first hash code; and
    insert the data item in a second partition of the hash table in a second location corresponding to the second hash code.

2. The non-transitory computer-readable medium of claim 1, wherein the program further causes the computing device to:

calculate a first transformation data selection code that is orthogonal to the first transformation action code;
select the first transformation data from a first transformation data table according to the first transformation data selection code;
calculate a second transformation data selection code that is orthogonal to the second transformation action code; and
select the second transformation data from a second transformation data table according to the second transformation data selection code.

3. The non-transitory computer-readable medium of claim 2, wherein in the calculation of the first transformation data selection code and the calculation of the second transformation data selection code, the computing device further generates a respective hash code based on the key.

4. The non-transitory computer-readable medium of claim 2, wherein each of the first transformation data table and the second transformation data table further comprises a respective table including a plurality of randomly generated data entries.

5. A method performed by processing circuitry, the method comprising:
receiving a data item via a network;
generating, by the processing circuitry, a key based on a subset of data from the received data item;
generating, by the processing circuitry, a first transformed key by inserting first transformation data into the key;
generating, by the processing circuitry, a second transformed key by inserting second transformation data into the key;
calculating, by the processing circuitry, a first hash code based on the first transformed key with a first hash function;
calculating, by the processing circuitry, a second hash code based on the second transformed key with a second hash function that is orthogonal to the first hash function;
inserting the data item in a first partition of a hash table in a first location corresponding to the first hash code; and
inserting the data item in a second partition of the hash table in a second location corresponding to the second hash code.

6. The method of claim 5, further comprising:
calculating a first transformation action code, the first transformation action code corresponding to a first transformation action in which the first transformation data is inserted into the key to form the first transformed key; and
calculating a second transformation action code, the second transformation action code corresponding to a second transformation action in which the second transformation data is inserted into the key to form the second transformed key, wherein
the processing circuitry generates the first transformed key according to the first transformation action code, and
the processing circuitry generates the second transformed key according to the second transformation action code.

7. The method of claim 6, further comprising:
calculating a first transformation data selection code that is orthogonal to the first transformation action code;
selecting the first transformation data from a first transformation data table according to the first transformation data selection code;
calculating a second transformation data selection code that is orthogonal to the second transformation action code; and selecting the second transformation data from a second transformation data table according to the second transformation data selection code.

8. The method of claim 7, wherein each of the first transformation data table and the second transformation data table further comprises a respective table including a plurality of randomly generated data entries.

9. The method of claim 7, wherein calculating the first transformation data selection code and calculating the second transformation data selection code each further comprise generating a respective hash code based on the key.

10. The method of claim 6, wherein the first transformation action and the second transformation action further comprise an action from a group of actions including an append, a prepend, and an interleave.

11. The method of claim 6, wherein calculating the first transformation action code and calculating the second transformation action code each further comprise generating a respective hash code based on the key.

12. The method of claim 5, wherein the key includes a subset of data fields extracted from the data item received via the network switch.

13. A network switch, comprising:
at least one processor circuit; and
a hash table accessible to the at least one processor circuit, the at least one processor circuit configured to:
receive a data item via a network;
generate a key based on a subset of data from the received data item;
generate a first transformed key by inserting first transformation data into the key;
generate a second transformed keg by inserting second transformation data into the key;
calculate a first hash code based on the first transformed key with a first hash function;
calculate a second hash code based on the second transformed key with a second hash function that is orthogonal to the first hash function;
insert the data item in a first partition of a hash table in a first location corresponding to the first hash code; and
insert the data item in a second partition of the hash table in a second location corresponding to the second hash code.

14. The network switch of claim 13, wherein
the at least one processor circuit is further configured to:
calculate a first transformation action code, the first transformation action code corresponding to a first transformation action in which the first transformation data is inserted into the key to form the first transformed key; and
calculate a second transformation action code, the second transformation action code corresponding to a second transformation action in which the second transformation data is inserted into the key to form the second transformed key, and
the at least one processor circuit generates the first transformed key according to the first transformation action code and generates the second transformed key according to the second transformation action code.

15. The network switch of claim 14, wherein the at least one processor circuit is further configured to:
calculate a first transformation data selection code that is orthogonal to the first transformation action code;
select the first transformation data from a first transformation data table according to the first transformation data selection code;

calculate a second transformation data selection code that is orthogonal to the second transformation action code; and select the second transformation data from a second transformation data table according to the second transformation data selection code.

16. The network switch of claim 15, wherein each of the first transformation data table and the second transformation data table further comprises a respective table including a plurality of randomly generated data entries.

17. The network switch of claim 14, wherein the first transformation action and the second transformation action further comprise an action from a group of actions including an append, a prepend, and an interleave.

18. The network switch of claim 13, wherein the key includes a subset of data fields extracted from the data item received via the network.

* * * * *